(12) United States Patent
Brockway et al.

(10) Patent No.: US 7,599,542 B2
(45) Date of Patent: Oct. 6, 2009

(54) SYSTEM AND METHOD FOR DETECTION AND DISPLAY OF DISEASES AND ABNORMALITIES USING CONFIDENCE IMAGING

(76) Inventors: John Philip Brockway, P.O. Box 1621, Davidson, NC (US) 28036; William Benjamin Carruthers, III, 1201 Turnbridge Rd., Charlotte, NC (US) 28226

( * ) Notice: Subject to any disclaimer, the term of this patent is extended or adjusted under 35 U.S.C. 154(b) by 575 days.

(21) Appl. No.: 11/191,768

(22) Filed: Jul. 28, 2005

(65) Prior Publication Data
US 2006/0228015 A1 Oct. 12, 2006

Related U.S. Application Data

(60) Provisional application No. 60/669,432, filed on Apr. 8, 2005.

(51) Int. Cl.
*G06K 9/00* (2006.01)
(52) U.S. Cl. ...................... 382/132; 382/128
(58) Field of Classification Search ................ 382/128, 382/132–133; 600/424–427
See application file for complete search history.

(56) References Cited

U.S. PATENT DOCUMENTS

| | | | |
|---|---|---|---|
| 5,003,979 A | 4/1991 | Merickel | |
| 5,235,510 A | 8/1993 | Yamada et al. | |

(Continued)

OTHER PUBLICATIONS

Subramanian Kalpathi R; Brockway John P; Carruthers William B, "Interactive detection and visualization of breast lesions from dynamic contrast enhanced MRI volumes" computerized medical imaging and graphics—the official journal of the Computerized Medical Imaging Society (United States) Dec. 2004, 28, (8), p. 435-44.

*Primary Examiner*—Duy M Dang
(74) *Attorney, Agent, or Firm*—Holland & Knight LLP; John P. Knight

(57) ABSTRACT

The present invention provides a method, apparatus, and computer instructions for improved detection and display of abnormal regions in mammals such as tumors, lesions, and other abnormalities (collectively referred to as abnormalities). In a preferred embodiment, a system and process is disclosed for classification of image points in the spatial dimensions and subsequent segmentation and classification of regions using morphological descriptors that operate in up to three spatial dimensions. Additionally, mapping of a set of classification images to color and opacity parameters is provided for display purposes. After image data is captured and readied for processing, each spatial point in the image is evaluated against predetermined intensity-time parameters. The resulting intensity-time confidence image is then processed to identify distinct regions within the image, and evaluate morphological characteristics of the identified regions using predetermined morphology templates/parameters. A confidence value is determined for each region, and this value is applied to the intensity-time value for each spatial point. The resulting output is a confidence image for the patient's region of interest, that can be used to detect different abnormalities, and display them in a conveniently manipulatable manner so a medical service provider can better understand the abnormality and take more directed actions (e.g., refined procedures) to remedy it as appropriate. The computational system disclosed can thoroughly and automatically detect these temporal patterns, as well as morphological patterns, and not only marks them for visual inspection with a confidence level, but also identifies the type or kind of cancer with an assigned probability, giving accurate indications of the extent of the cancer.

28 Claims, 14 Drawing Sheets

U.S. PATENT DOCUMENTS

| | | |
|---|---|---|
| 5,273,040 A | 12/1993 | Apicella |
| 6,112,112 A | 8/2000 | Gilhuijs |
| 6,430,430 B1 | 8/2002 | Gosche |
| 6,438,403 B1 | 8/2002 | Cline |
| 6,553,327 B2 | 4/2003 | Degani |
| 6,591,004 B1 | 7/2003 | VanEssen |
| 6,611,778 B2 | 8/2003 | Degani |
| 7,088,850 B2 * | 8/2006 | Wei et al. .............. 382/128 |
| 7,245,748 B2 | 7/2007 | Degani et al. |
| 7,317,821 B2 | 1/2008 | Chen et al. |
| 2002/0082495 A1 | 6/2002 | Biswal |
| 2004/0081340 A1 | 4/2004 | Hashimoto |
| 2004/0184644 A1 | 9/2004 | Leichter et al. |
| 2005/0010097 A1 | 1/2005 | Cline |
| 2005/0027188 A1 | 2/2005 | Metaxas |
| 2005/0096530 A1 | 5/2005 | Dal et al. |
| 2005/0113651 A1 | 5/2005 | Wood et al. |
| 2007/0036402 A1 | 2/2007 | Cahill et al. |
| 2007/0165920 A1 | 7/2007 | Gering et al. |

* cited by examiner

SYSTEM AND METHOD FOR DETECTION AND DISPLAY OF DISEASES AND ABNORMALITIES USING CONFIDENCE IMAGING

RELATED APPLICATION

This application is a continuing application claiming priority to U.S. provisional application 60/669,432, filed Apr. 8, 2005, which is fully incorporated herein for all purposes.

FIELD OF THE INVENTION

The present invention generally relates to image analysis, and more particularly to automatically detecting and displaying tumors, lesions, and other abnormalities from a series of images over time.

BACKGROUND

Breast cancer is one of the most frequently occurring cancers among women in the United States and Europe. Early, accurate detection is one of the best defenses against cancer.

Of course, there are a variety of methods and systems for automatically detecting breast lesions and tumors in images from ultrasound, digital and analog mammograms and MRI images. See US2005/0027188. It is known that contrast agents when passing through tumors behave differently than when the contrast agent passes through ordinary tissue (see U.S. Pat. No. 6,553,327), which aids or facilitates diagnosis of cancer.

Unfortunately, many women who suspect they have breast cancer just undergo routine screening mammograms, diagnostic mammograms and ultrasound, and end up without definitive diagnosis because mammography and ultrasound both depend on varying density of tissue (i.e., that tumor is a different density than normal breast parenchyma). Both mammography and ultrasound determine image contrast based on the varying density of tissue. Tumors may be found in this way, as they have different densities than normal breast parenchyma. When there is a suspicion that something is wrong with the breast, women and men both undergo biopsy to confirm this suspicion of malignancy with histopathology. Subsequently, upon resection, the results have shown when differences in tissue densities were detected that mammograms consistently underestimate the extent of the malignancy and may also misrepresent the location of the malignancies.

Thus, if the mammographer or gynecologist is uncomfortable with these estimates, it is now typical for patients to be subsequently referred for MRI scanning of their breast. Unfortunately, as many as 30% of breast lesions are missed during the mammography screening process. Additionally, when radiologists classify mammograms as being suspicious and biopsies are performed to confirm malignancy, less than one third of mammographically-identified suspicious lesions are found positive. The actual 3D location of these tumors may be one cause of these unacceptable "misses," as when the needle biopsy is performed in the wrong location.

Unlike mammograms, contrast differences in MRI images do not depend upon tissue density differences, but upon differing proton distributions, and with contrast agents, cell permeability and other factors such as angiogenesis play a role. However, the discriminative characteristics of the MRI that seem to matter most in the accurate detection or differentiation of cancer are linked to certain dynamic and static parameters. Both these dynamic and static parameters are exceedingly difficult for human eyes to discern because: 1) the dynamic factors depend on temporal factors, i.e., detecting whether a region of an image is getting brighter in intensity over time or not, and whether that affected specific region of interest (ROI) is contiguous with other regions that are doing the same thing over time, or not. Answering whether the malignancy is one focus or multiple foci is immensely challenging to the naked eye. Without a better way to detect malignancies, the substantially greater cost of MRIs means that mammograms remain the first step in early detection, despite its known limitations.

Many existing systems allow humans to see 2D slices of intensity images, but both the dynamic and static parameters in many display systems are exceedingly difficult for humans to discern because: (1) the dynamic parameters depend on whether or not the intensity of a particular point in the image is increasing over time, and (2) the static parameters are defined by contiguous groups of points, called regions, that exhibit similar characteristics. Due to the large amount of image data produced from scans like MRIs, determining whether or not a malignancy has one focus or multiple foci is immensely challenging. Manually searching for potential malignancies in images can be a time-consuming and error-prone task.

Image processing can be used to automate this task. Some automated and semi-automated approaches to finding cancer in images use texture or intensity information from a single image taken at a particular time. However, using a single intensity for each image point is often insufficient for reliably determining the presence or absence and extent of cancer.

Other approaches have tried to identify regions in 2D images and use shape information to determine the likelihood of cancer. However, considering only individual, fixed-axis 2D slices can cause algorithms to miss regions that exhibit certain shape characteristics in other axes.

Volume rendering can also be used to display 3D image data. Direct volume rendering (DVR) is an approach that displays all image data simultaneously, which is useful for visualizing image data that does not contain distinct, easily-distinguished features. Other approaches include surface rendering, which shows the surface of only certain distinct image features. Another widely-used approach is maximum intensity projection (MIP) rendering, which shows only the highest intensity values projected along a view axis through the volume.

Another problem with existing approaches for finding malignancies is that they focus primarily on determining the existence and location of the malignancy without determining the type of malignancy. Malignancies of different types exhibit similar patterns, requiring intensity information over time from images and predetermined parameters to classify malignancies. However, using insufficient time points may limit the effectiveness of discrimination.

Further, examining thousands of images (bilateral breast cases consists of approximately 1,000 or more images), and dividing these hundreds of images into sub-regions, comprising tens of thousands of comparisons, is tedious and error prone. The human eye is not adept at "fine-grained" temporal discrimination, and the human brain is easily fatigued by such a difficult task. The human eye of the radiologist or surgeon, for example, does not retain intensity difference well over time nor detect them well. If it did, the result would be visual "smearing" of scenes.

There remains, therefore, a need for a better approach to image processing for evaluation of tumors, lesions, and other abnormalities. A desirable approach would use both intensity-over-time information and region information in up to three spatial dimensions. It would also use known characteristics to automatically evaluate the sizable image data. Because breast images consist of soft tissue without distinct features, use of approaches like DVR in this context would be suitable, because it could show identified malignancies in the entire image in addition to the breast tissue. Just such an approach is now possible and described below.

SUMMARY

The present invention provides just such a method, apparatus, and computer instructions for improved detection and display of abnormal regions in mammals such as tumors, lesions, and other abnormalities (collectively referred to as abnormalities). In a preferred embodiment, a system and process is disclosed for classification of image points in the spatial dimensions and subsequent segmentation and classification of regions using morphological descriptors that operate in up to three spatial dimensions. Additionally, mapping of a set of classification images to color and opacity parameters is provided for display purposes. After image data is captured and readied for processing, each spatial point in the image is evaluated against predetermined intensity-time parameters. The resulting intensity-time confidence image is then processed to identify distinct regions within the image, and morphological characteristics of the identified regions are evaluated using predetermined morphology templates/parameters. A confidence value is determined for each region, and this value is applied to the intensity-time value for each spatial point. The resulting output is a confidence image for the patient's region of interest, that can be used to detect different abnormalities, and display them in a conveniently manipulatable manner so a medical service provider can better understand the abnormality and take more directed actions (e.g., refined procedures) to remedy it as appropriate.

The computational system disclosed can thoroughly and automatically detect these temporal patterns as well as morphological patterns, and not only marks them for visual inspection with a confidence level, but also identifies the type or kind of cancer with an assigned probability, giving accurate indications of the extent of the cancer.

In so doing, this system can reduce the number of false negative biopsies due to a more accurate (e.g., 3D) volumetric presentation of the location, size, extent and kind of cancer that is being targeted. It can reduce the number of re-operations to clean out "dirty margins," i.e., malignancies that were left behind when surgeons underestimated the extent of the tumor because they depended upon mammography and ultrasound. It can detect diffuse tumors that are undetectable at all by mammography because tumor cells are so sparsely distributed. Additionally, neither the examiner nor patient can feel any "lump" and no mass can be detected, even though the malignancy exists and is a clear and present danger to a woman's health. It can also help detect these and other smaller tumors, prior to their metastasizing, and detects tumors earlier in their development when early detection can mean sparing a life. The system can also reliably measure whether each tumor volume is growing or shrinking as a result of chemotherapy, using measurements that are constant from time to time, rather than employing visual estimates. In so doing, the system can help change the course of treatment for patients. It can also detect cancer behind a prosthetic breast implant, when a woman has had a mastectomy and subsequent re-construction, without harming the implant or risking rupture as mammograms may. This is particularly helpful, since it is vital to follow women who have been treated for cancer with surgical reconstruction to know whether there is a re-occurrence of the cancer, and the present invention significantly helps in this effort.

BRIEF DESCRIPTION OF THE DRAWINGS

While the invention is defined by the appended claims, as an aid to understanding it, together with certain of its objectives and advantages, the following detailed description and drawings are provided of an illustrative, presently preferred embodiment thereof, of which:

DETAILED DESCRIPTION OF PREFERRED EMBODIMENTS

In a preferred embodiment of the invention, a system is provided for processing a series of images over time and automatically detecting and displaying tumors, lesions, and other abnormalities based on the processed image data. This process has significant implications for improved and more cost effect detection of common cancers such as those found in the breast and prostate, and may dramatically alter how diagnostic procedures are carried out in detecting mammalian cancers. This can have benefits for both current screening and procedures, as well as for running the studies to improve detection for these and other abnormalities.

Figure 1A:
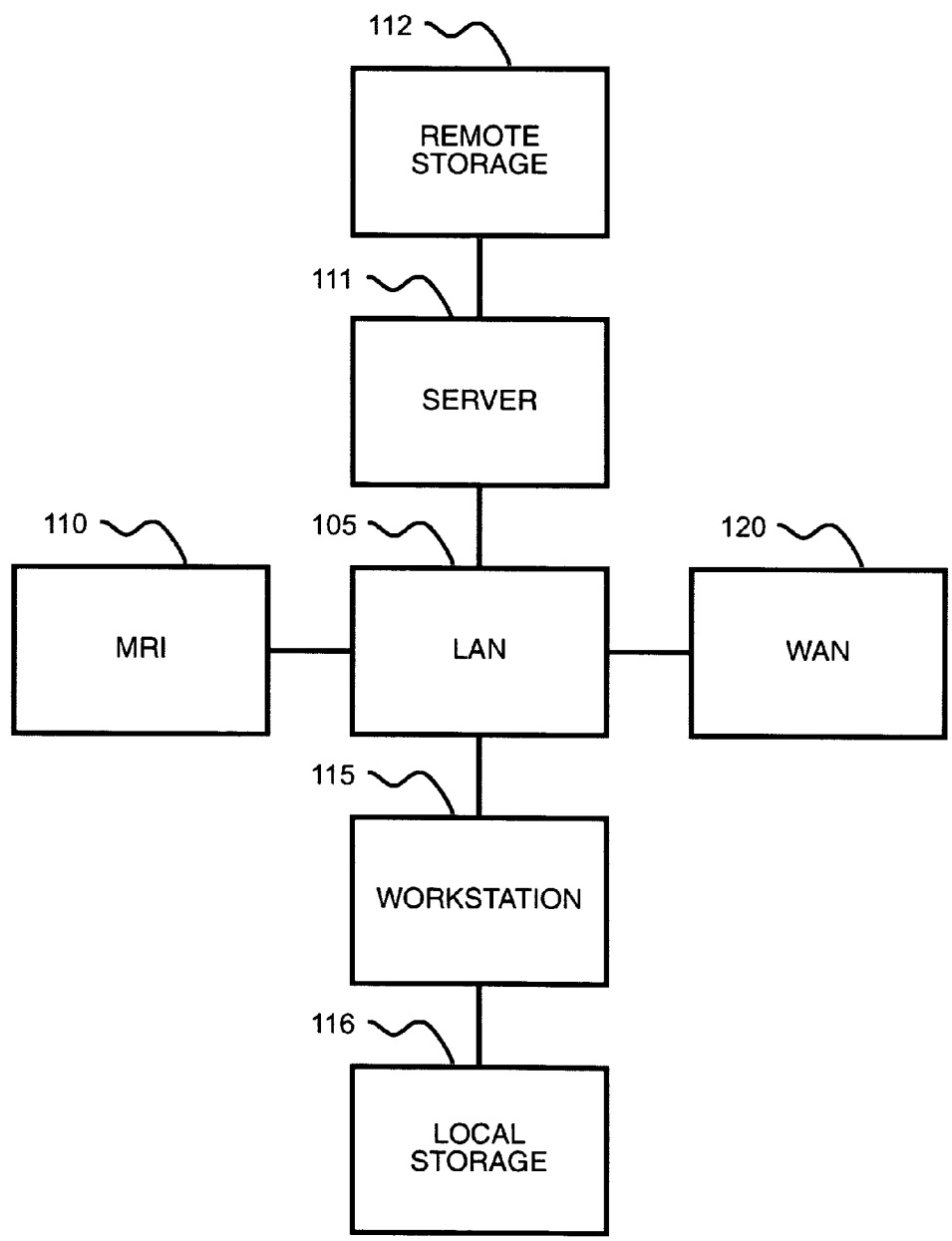
FIGS. 1A-1B are block diagrams illustrating an imaging system in accordance with a first embodiment of the invention.
Figure 1B:
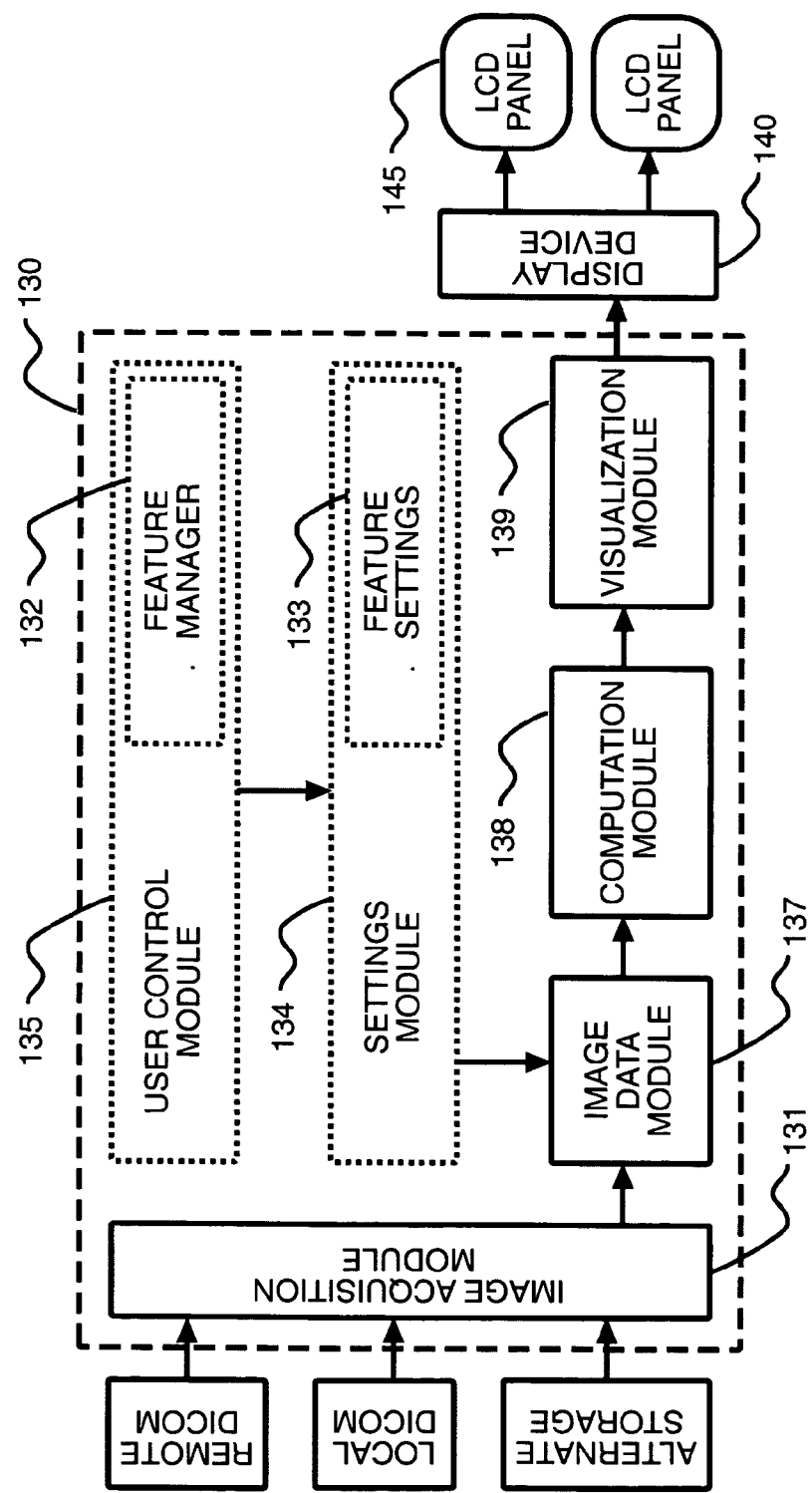
Figure 2:
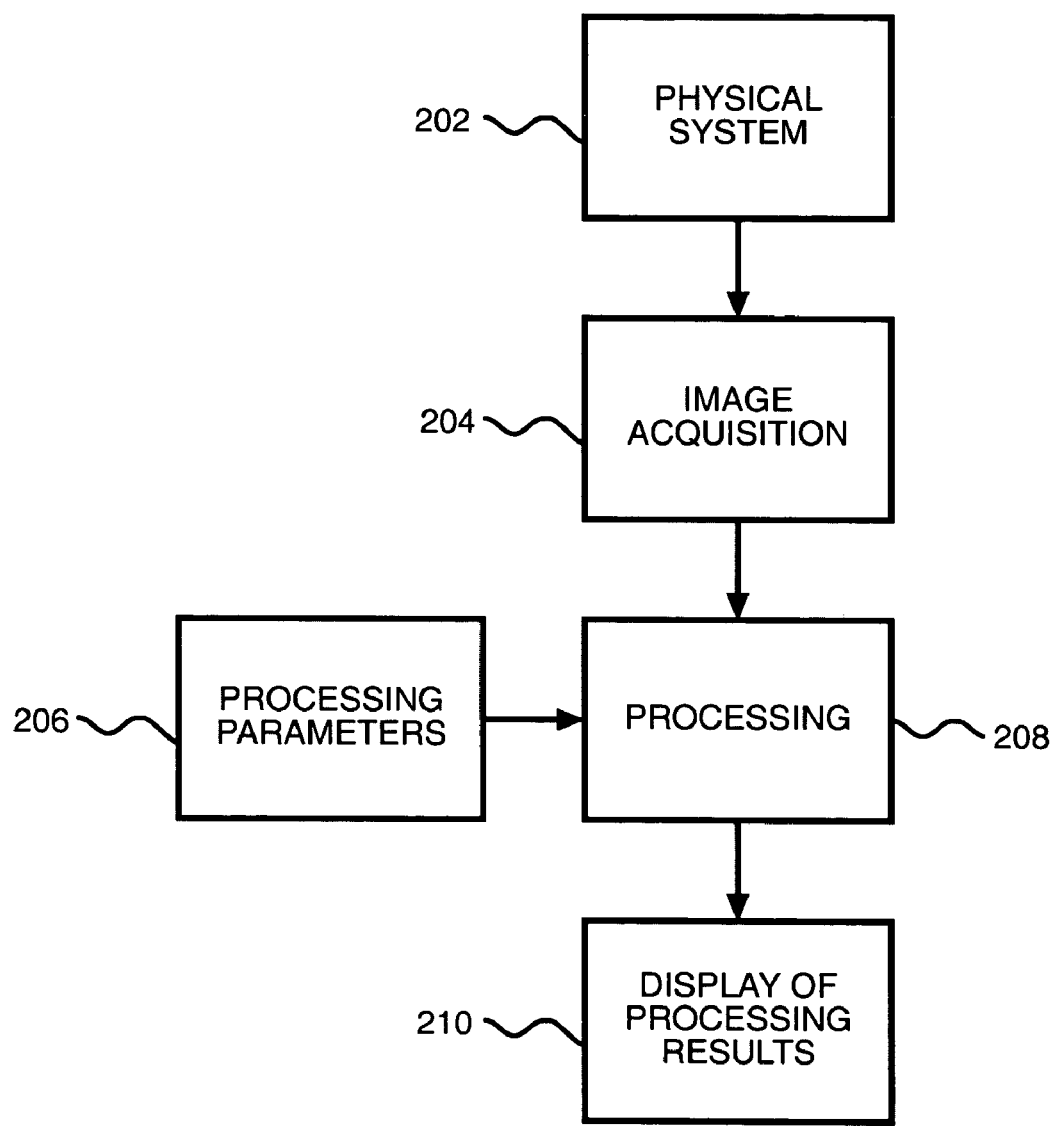
FIG. 2 is an overview flow chart illustrating a process for image acquisition, processing, and display (further illustrated in FIGS. 3-6) in accordance with the first embodiment of the invention.

Referring to FIGS. 1A-2, a broad overview of a system suitable for processing images is shown, illustrating a presently preferred embodiment. An image acquisition device 110, 204 acquires image data from a region of interest in a mammalian patient 202. In order to achieve sufficient resolution advanced devices such as magnetic resonance imaging (MRI) systems are preferred for detection of breast tumors and other abnormalities. While the image data can be stored and processed locally, it is increasingly common to have the image data stored in a networked database 112, accessible via servers 111 by local and/or remote processing systems 115.

The particular hardware, software, and network configurations that can be used are matters of individual design choice, although the size of a typical DICOM (Digital Imaging and Communications in Medicine standard) image file for a series of 3-D MRI images over time can be in excess of 1 GB in size, and the processing step 108 will perform better on systems such as more powerful personal computers with higher processing speeds, memory capacity, and graphics card throughput. The image data itself will vary depending on the system used, but in the preferred embodiment each data point has a characteristic quantity of the patient 202 at a corresponding point in the region of interest. This image data, the dimension of the grid, and any other meta-data associated with the data forms an image file. Image acquisition 204 may include transferal, storage, and later access of images.

Some of the typical processing modules that may be used to implement the system are shown in FIG. 1B. When using MRI DICOM images, the images are retrieved from their local or remote stores 125 and input via a DICOM manager 131. Settings and User control modules 132-135 adjust the parameters in accordance with user preferences for image pre-processing and processing. The DICOM image files are then readied for processing (e.g., by normalization in image data module 137), processed (e.g., filtered and formed into a confidence image in computation module 138), and manipulated into a desirable form of visualization (e.g., module 139 and display devices 140-150).

While a variety of different protocols may be appropriate for different tissues and regions of interest, an illustrative protocol found useful in one MRI breast study includes the protocol elements set forth in Table 1 below:

TABLE 1

| MRI BREAST PROTOCOL | | |
|---|---|---|
| 3PLANE LOC | SAG T1 | SAG T2 FAT SAT |
| IMAGE MODE 2D | IMAGE MODE 2D | IMAGE MODE 2D |
| 3 PLANE LOC | SAG | SAG |
| FOV 40 | SPIN ECHO | PULSE SEQ. FSE-XL |
| 10 THICKNESS | NO PHASE WRAP | EXTENDED DYNAMIC |
| 2 SPACING | TR = 500 | RANGE |
| NO SATS | TE = MINFULL | "FAST, NO PHASE |
| MATRIX 256 × 128 | FOV 20 | WRAP, FAT SAT" |
| NEX = 1 | THICKNESS 3 MM | TR = 4350 |
| PHASE FOV | SPACING 1 MM | TE = 102 |
| | MATRIX 256 × 256 | ETL = 20 |
| | NEX 1 | FOV 20 |
| | FREQ DIR A/P | THICKNESS = 4 |
| | PHASE FOV 1 | SPACING 1 |
| | NEX 3 | SAT FAT |
| | | MATRIX 320 × 256 |
| | | FREQ DIR A/P |

| DYNAMIC SERIES PRE- AND POST-CONTRAST, PT PRONE WITH ARMS ABOVE HEAD, USE HAND FOR IV SITE. | |
|---|---|
| PREP TIME = 40 | MULTI PHASE = 5 |
| TE = MIN FULL | ZIP 2 |
| FLIP ANGLE = 30 | LOC PER SLAB 50 |
| FOV = 20 | 1 PHASE NO CONTRAST 4 |
| THICKNESS = 2.6 mm | WITH CONTRAST |
| FAT SAT | |
| SPACING 0 | |
| MATRIX = 320 × 160 | |
| NEX = 1 | |
| FREQ DIR. A/P | |

In carrying out this protocol, a breast region of interest is sampled to obtain an MRI volume (3D) image with intensity values over time. This volume may differ for varying sites, from a single breast at the older sites with older MRI machines to the entire volume of both breasts scanned simultaneously. For prostate imaging, a sagittal MRI series may be taken through the entire prostate and pelvic floor region. In general, the medical services provider may use any available imaging system, although the degree of resolution and what may be detected over time will be constrained by the selected system, as one skilled in the art will readily appreciate.

In the above protocol, breast image acquisition used a modified 4-channel phased array breast coil for breast image acquisition, and used a single phase, inflatable intra-rectal coil for the prostate image acquisition. In each case the coil was chosen for maximum signal-to-noise ratio. Preferred processing parameters were selected to achieve constant system parameters, predetermined to be constant across images, together with feature template parameters. Feature template parameters were used to generally define a particular kind of feature that may or may not be present in an image.

Analysis of the processing results depends on the modules selected for results manipulation or display. These methods may include the storage, transformation, and/or display of the results, depending on the user's objectives. In one study of breast images, the results were displayed visually in both 2D and 3D, composited with the intensity image data, for use in both detecting tumors and abnormalities and in planning surgical procedures.

Figure 3:
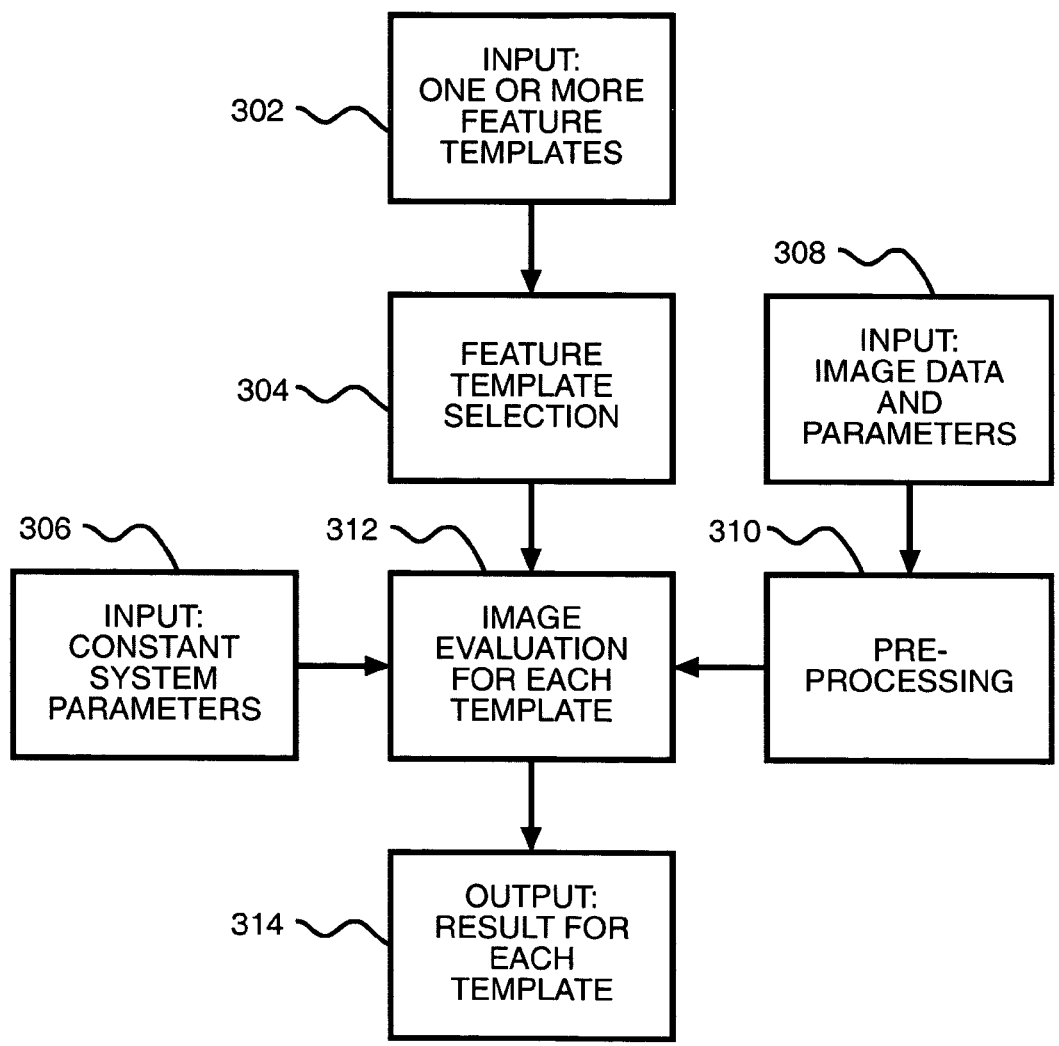
FIG. 3 is an overview flow chart illustrating an image processing step according to the embodiment of FIG. 2.

Referring to FIG. 3, the basic steps in the image processing according to the preferred embodiment are shown. In feature template selection step 304, one or more feature templates may be selected for use in evaluating the image after preprocessing 310. Feature templates may be selected by a variety of means. In the current example, a default set of templates is predetermined for use when a new image is acquired. Users may add, remove, or modify templates that are used on an image via a graphical template management interface. Processing output 314 consists of an evaluation result for each feature template.

Preprocessing step 310 may include any desirable image processing performed on the image data in preparing it for evaluation by feature templates, such as registration, normalization, smoothing, or other image filters. In the current example, normalization parameters (such as shift and scale values) are used to normalize each intensity value at each time point for each spatial point (i.e., each pixel, or a group of adjacent pixels, representing a minimum spatial unit for use in evaluating the region of interest). These parameters are derived from default window center and window width values included in the image meta-data. Window center and width define the default range of intensities that are mapped to a display. They may be determined by other convenient means, such as by finding the minimum and maximum intensity values present in the image and defining shift as the minimum value and scale as the difference in the minimum and maximum values. Normalization using the shift and scale parameters is performed as follows: intensity<shift, 0; shift <=intensity <=shift+scale, (intensity−shift/scale); shift+scale<intensity, 1.

Figure 4:
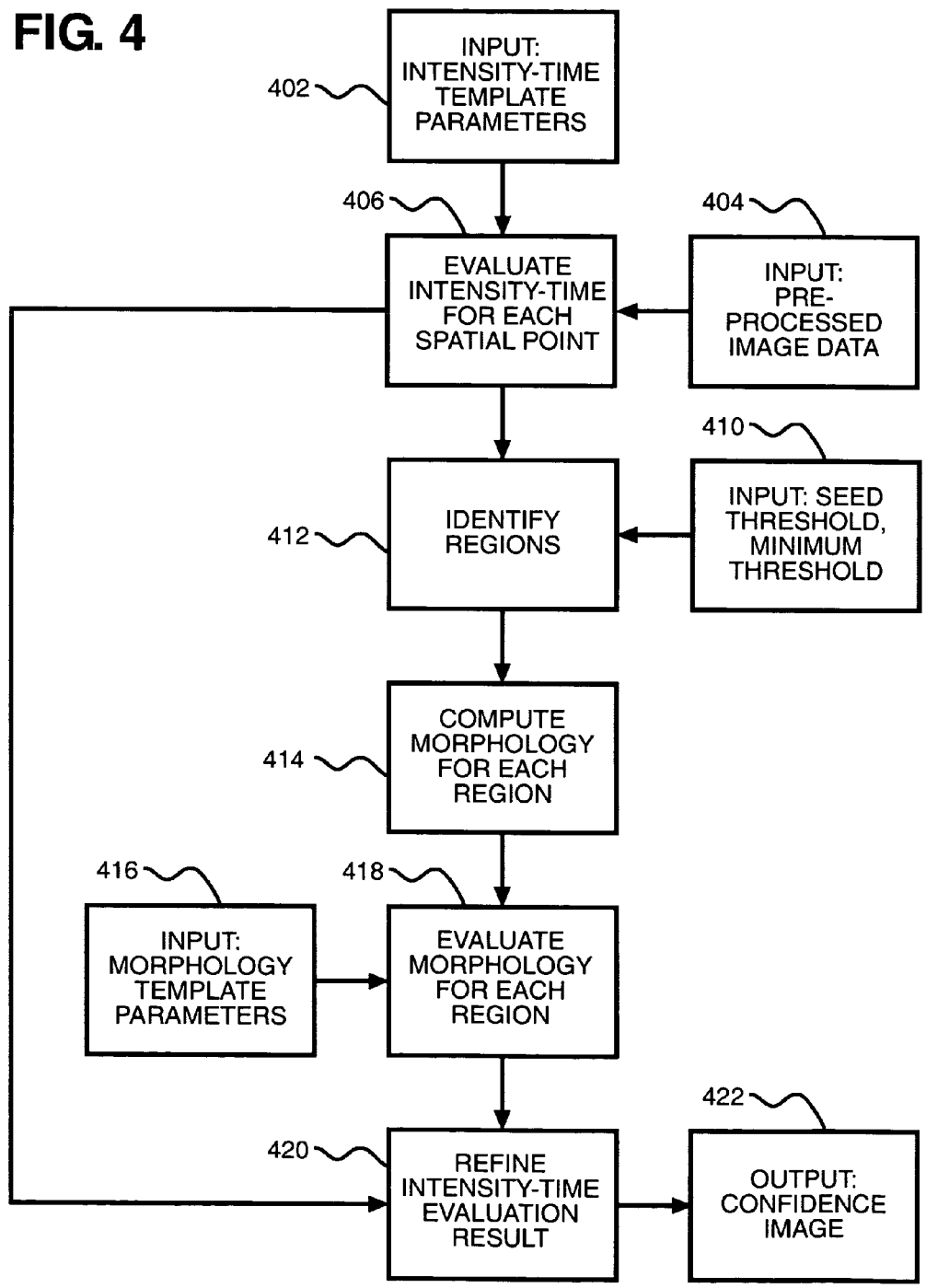
FIG. 4 is a flow chart illustrating a feature template image evaluation process according to the embodiment of FIG. 3.
Figure 5A:
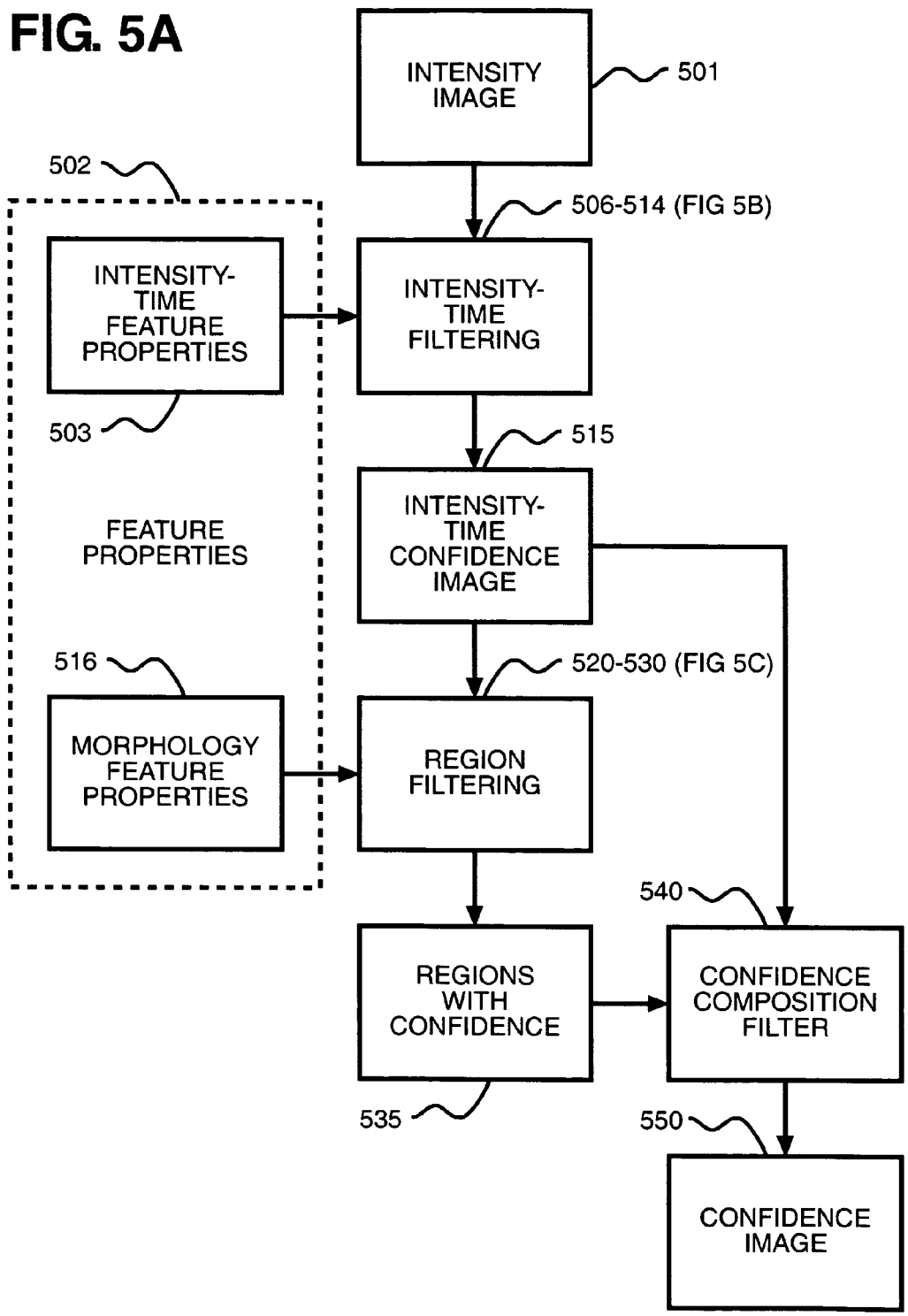
FIGS. 5A-5C are flow charts illustrating a process for time-intensity and region confidence filtering for use in arriving at a time-intensity confidence image and region collection (with confidence values) according to a second embodiment of the invention.
Figure 5B:
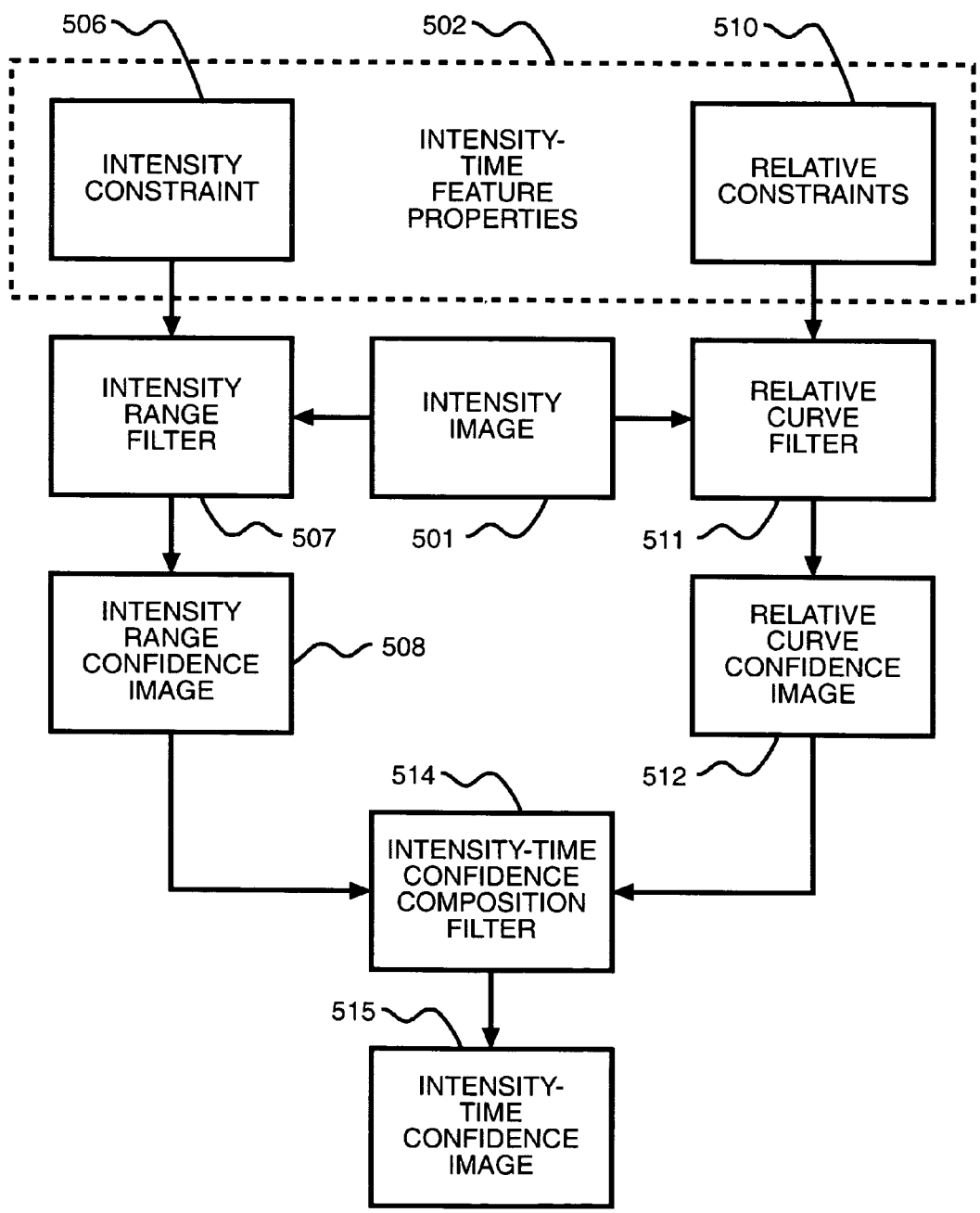
Figure 5C:
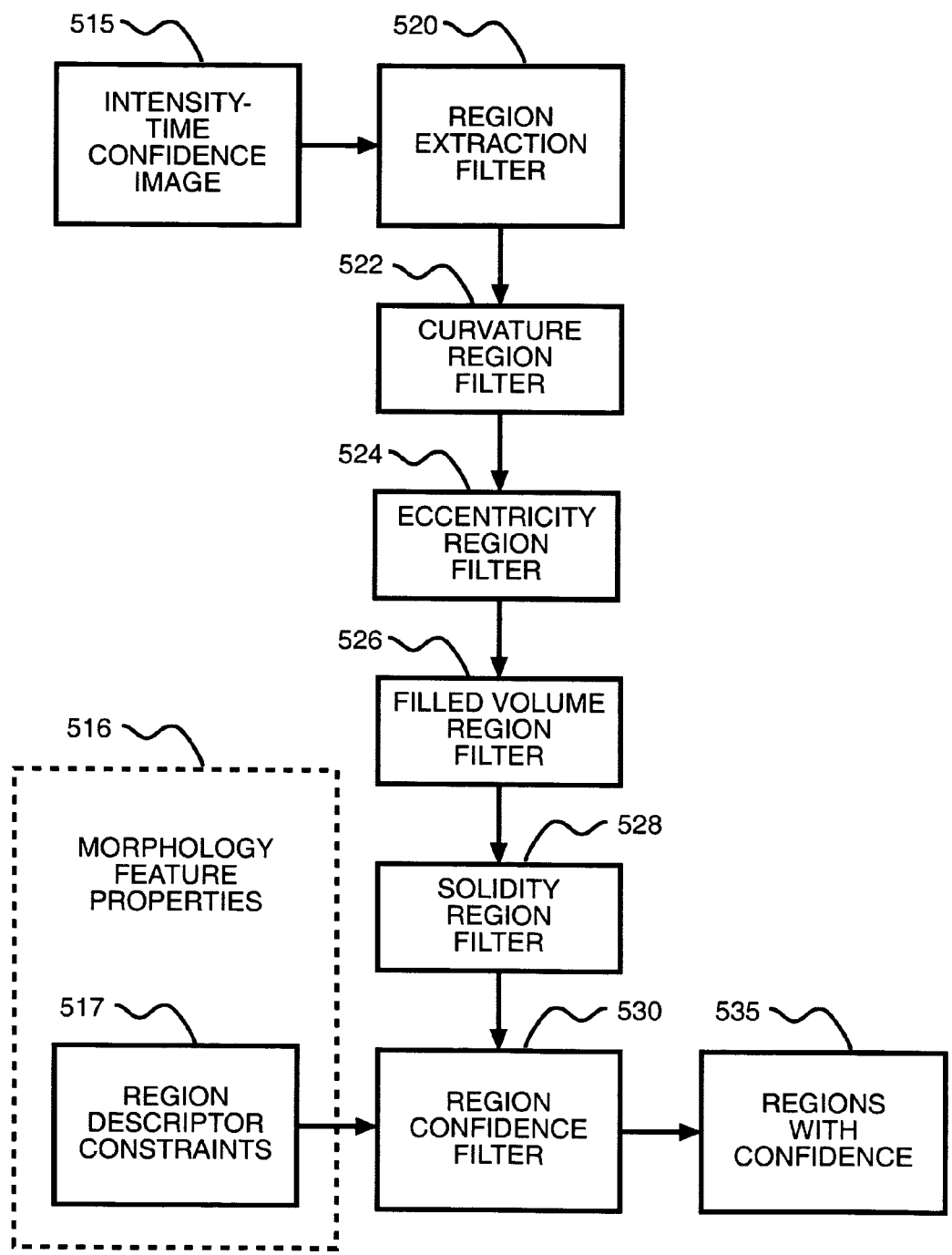

Once the images are preprocessed, they are ready for evaluation in the processing module. Turning now to FIGS. 4-5C, an embodiment of the steps used in image processing are illustrated. Beginning with FIG. 4, steps for evaluating the image for a single feature template are shown. This evaluation involves both evaluating each spatial point individually and evaluating sets of connected spatial points (e.g., regions), to determine a confidence value for each spatial point that represents the probability that the point contains an instance of the kind of feature defined by the feature template.

Figure 7:
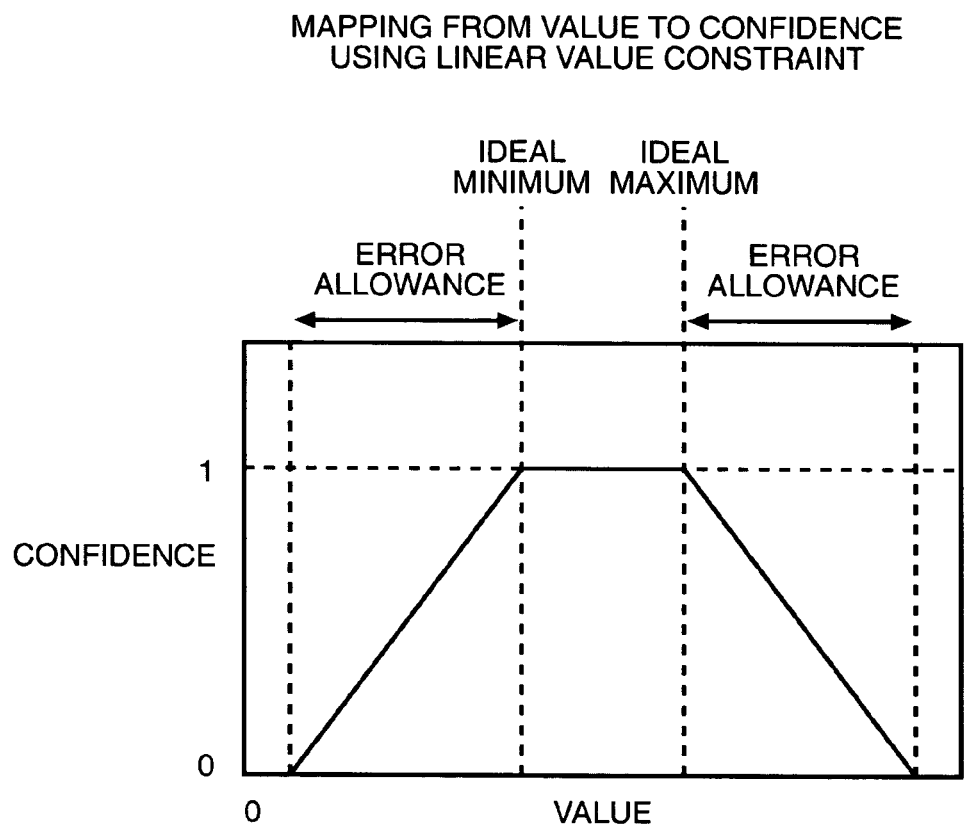
FIG. 7 is a graph illustrating a linear constraint mapping suitable for use in image processing according to the first embodiment of the invention.

In the preferred case, feature template parameters are used to determine confidence values. These parameters include a number of predetermined value constraints, including minimum, maximum, and error allowance values that may be applied to a scalar value to compute a confidence value. This confidence value represents the nearness of the scalar value to the ideal or predetermined range defined by the experimentally derived minimum and maximum constraint values. A value within the predetermined range produces maximum (e.g., value 1.0) confidence. Error allowance allows a range of diminishing confidence greater and less than the predetermined range. The mapping function may be implemented in various ways, such as with a linear or Gaussian function. For a linear mapping, such as the one shown in FIG. 7, confidence may be computed, e.g., according to the steps illustrated in Table 2:

TABLE 2

| | |
|---|---|
| value <= min − error: | 0 |
| min − error < value < min: | (value − (min − error))/error |
| min <= value <= max: | 1 |
| max < value < max + error: | 1 − (value − max)/error |
| max + error <= value: | 0 |

In the preferred embodiment, processing parameters are divided into intensity-time and morphological parameters. Intensity-time parameters consist of a series of intensity value constraints that correspond to the intensity values at a given spatial point and a time values for each constraint that defines the time point to which it applies. The minimum and maximum time values define a constraint time interval. In the example discussed above, five intensity-time constraints are defined, but images may be evaluated with one or more defined constraints. Normally, for each spatial point, constraints are used to evaluate the intensity values at each corresponding time point. If an image contains a time point outside the constraint time interval, intensities at that time point are not evaluated. If an image contains a time point that is within the constraint time interval but is not equal to any of the constraint times, intensities for that time point may be derived by other means. One example is interpolating between the corresponding intensities at the two nearest time points using a predefined function.

Morphological parameters include one or more constraints each corresponding to a particular morphological characteristic that can be determined from the region of interest. In the example of FIG. 5C, these characteristics include curvature, eccentricity, filled volume, and solidity, where:

(1) Curvature generally represents how bumpy or smooth the surface of the region is. One meaning for curvature is the variance of the set of distances from the centroid of the region to each location on the surface of the region.

(2) Eccentricity generally represents how spherical or elongated a region is. To compute eccentricity for a region, one typically finds a bounding ellipsoid for the region. One meaning for eccentricity is the ratio of the distance between the foci of the ellipsoid and the length of its major axis.

(3) Filled volume generally represents the volume of a region with all holes within it filled. To compute the filled volume for a region, one typically fills all holes in the region with an intensity value equal to the average intensity of the region, with the volume being computed by summing the intensity values at each location in the region.

(4) Solidity generally represents the ratio of the original volume of the region to its filled volume.

In one study, intensity-time parameters were derived for five kinds of malignancies or abnormalities from over 750 breast cases and several prostate cases. Starting with MRI cases with proven malignancy determined either by fine needle aspiration, mammotome biopsy, lumpectomy specimen, mastectomy specimen, or a combination of biopsies, each MRI image volume was examined for its temporal varying intensity characteristics concordantly associated with distinct morphological features, such as spiculation or bumpy textures associated with the "surface" or "skin" of the suspected abnormality. The temporal varying intensity characteristics were accumulated manually from within each volume for each volume and recorded. Parametric statistics were used to determine the central tendencies, ranges, and deviations of each of the major malignancies, such as invasive ductal carcinoma in situ, invasive ductal carcinoma, invasive lobular carcinoma, etc. and their differences from one another. Rough "goodness-of-fit" templates were constructed from such parameterically-derived data and used to match each case to its associated type. As one example, as one skilled in the arts would recognize, a practitioner could match the location and type or kind of an abnormality found by a pathologist within a mastectomy specimen together with the three-dimensional location of that abnormality within the MRI volumetric image series and subsequently examine each and every three dimensional voxel within that particular MRI sub-region-of-interest, accumulating from each voxel, both its specific kinetic and static parameters. Any practitioner could then, using these accumulated parameters, calculate the central tendencies of that particular sub-region-of-interest, as would be revealed with means, modes, medians, standard error, standard errors of the mean, first and second derivatives, standard deviations, etc., and would then be enabled to construct or form a template or standard with a central tendency, its maximum, its minimum, together with its deviation for that particular kind or type of abnormality. In a like fashion, specific sub-regions-of-interest also have shape characteristics that distinguish themselves as abnormalities, such as spiculation (having star-shaped pointed boundaries) or non-ovoid (olive-like) hulls, or skins or outer boundaries. The commonness of features such as these can be abstracted and accumulated and in a similar manner, formed into a series of distinctive and specific templates that could be matched to the pathologist's interpretation of abnormality. Template construction and template matching are well recognized by those skilled in the arts.

Those skilled in the art will readily appreciate how to experimentally derive similar parameters from known cases, and these techniques may be readily extended to build libraries of parameters based on varying study groups and system design constraints.

Figure 8:
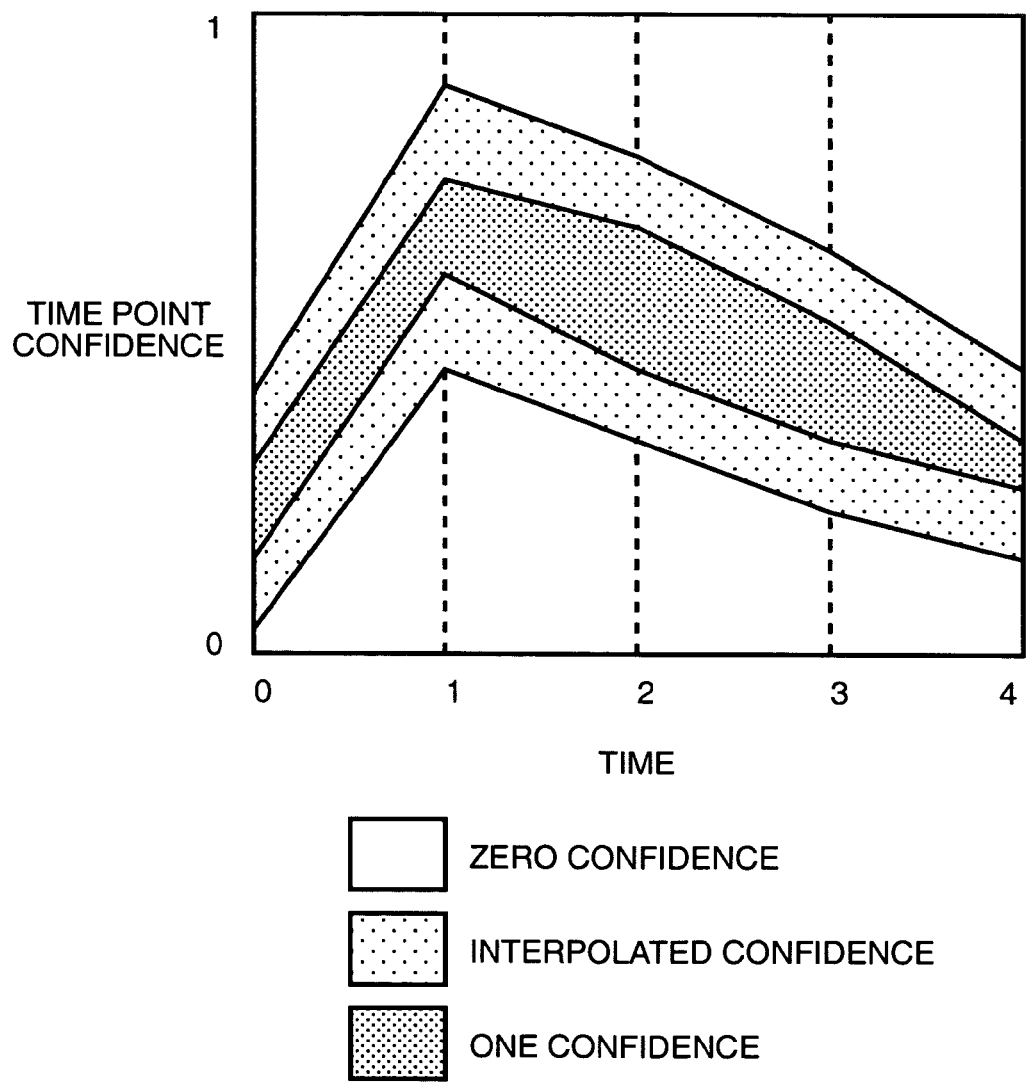
FIG. 8 is a graph illustrating a series of constraint mappings suitable for evaluating a series of intensities in image processing according to the first embodiment of the invention.

When processing an image, these intensity-time parameters are input together with the pre-processed image data and used to evaluate each spatial point in the image (steps 402-406, 501-503). For an individual spatial point, the series of intensity values over time at the point are evaluated to produce a single confidence value for the point that represents how closely the series of intensities at the point approximates an ideal or predetermined series of ranges of intensities for the given feature template. This evaluation is preferably performed by computing a confidence value from each intensity value at the point using its corresponding constraint parameter and multiplying each of these confidence values together to obtain a single confidence value for the point (507). In the preferred embodiment, where a time varying intensity occurs in the cells of interest, the constraints will similarly vary over time, such as shown in mapping of FIG. 8. Such short time variations have been found to occur in certain tumors and abnormalities through administration of, e.g., intravenous gadolinium-diethylenetriamine penta-acetic acid (Gd- DTPA) as an aid to the MRI imaging. The use of this or other intravenous substances with a characteristic wash-in and/or wash-out rate is significantly different for tumors than normal tissue, and can prove particularly advantageous in yielding a more distinct confidence mapping. Those skilled in the art will appreciate that alternate methods may also be used for combining the confidence values at each time. Such may include performing a weighted average to compute the single confidence value for the point. An alternative method to better accommodate the varying intensities produced by different imaging equipment relies on evaluating an initial intensity at a predefined time point and the relative curve at the point. The values in the relative curve may be determined by computing a proportion score for each time point as the intensity at the time point divided by the initial intensity. To evaluate this set of values, relative constraints may be similarly computed by dividing the minimum and maximum values by those values in the initial constraint and defining the error allowance as an appropriate value proportional to the original value. Whichever approach, the result of the evaluations at each point is an image no longer with a time dimension, and having the same spatial dimensions as the intensity image, containing a confidence value at each point (referred to as a first or intensity-time confidence image)(output of 406, 508).

After obtaining the confidence image, connected confidence regions are identified from the confidence image using a seed confidence threshold and minimum confidence threshold from the constant system parameters (410-412, 510). The seed confidence threshold parameter may be a scalar value that defines the minimum confidence value that must be present in a location for it to be identified as part of a region of a predetermined type of tissue. The minimum confidence threshold value defines the minimum confidence value for a point to be included in any region. These parameters may be changed to yield different behavior, but a broad range, e.g., thresholds from 0.8 and 0.3, have been seen to yield useful results for the seed and minimum values, respectively. Regions are preferably then identified by attempting to grow a region from each initial seed point, propagating to adjacent points. Each point that is evaluated is marked as visited, with points that have been visited not evaluated again. To initiate the growth of a new region, a given point should have a confidence value greater than or equal to the seed confidence threshold value. When a point is evaluated for inclusion in a region, it should have a confidence value greater than or equal to the minimum confidence threshold value. This method may be performed in a confidence image of any spatial dimension, but for imaging of most cancers it is preferable to use three dimensional images.

After a set of regions has been identified, morphological characteristics are determined for each of them (steps 414-418, 522-530). The characteristics may be computed from images of two or three dimensions, although, again, imaging like 3D MRI scans provide substantially higher resolution for certain soft tissue differentiation and allow for true 3D identification and localization.

For each region, the morphological characteristics associated with the region are evaluated to produce a confidence value for the region that represents how closely the morphology of the region matches a set of predetermined ranges of characteristic values. In the example of a breast evaluation, each evaluation was performed by computing a confidence value for the region from each morphological characteristic value, together with its corresponding constraint, and subsequently multiplying the confidence values together to obtain an overall confidence value for each region. This method of combining morphological confidence values may be performed in alternate ways, such as by computing a weighted average. The constraints will vary based on the type of tumor or abnormality to be detected, and those skilled in the art will appreciate how to derive predetermined constraint values for differing tissues and imaging systems. These constraints may be experimentally derived.

Last, the first confidence image is refined using the identified regions together with their associated confidence values. For each point within each region, the confidence value at the corresponding point in the confidence image is weighted in view of (e.g., multiplied by) the confidence value of the region.

Figure 6:
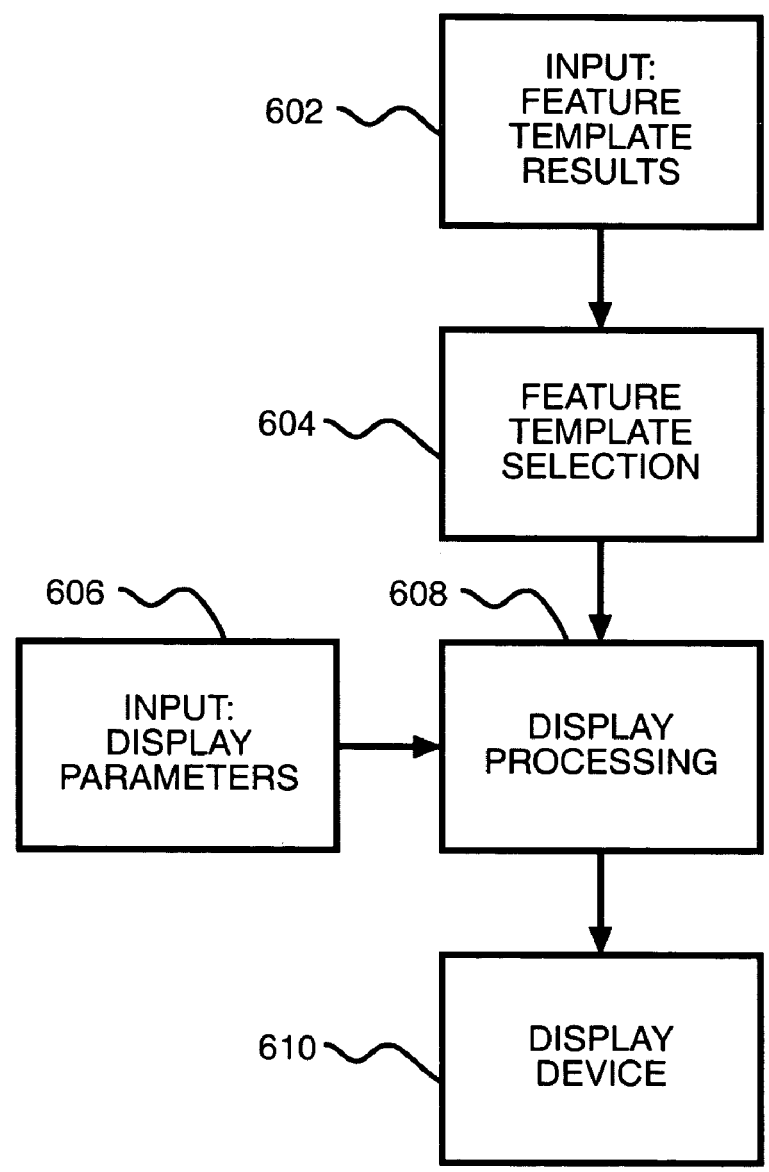
FIG. 6 is a flow chart illustrating a display process according to the embodiment of FIG. 2.

Referring to FIG. 6, the details of displaying the processing results are shown. Displaying may consist of any means that can map a set of feature template results to a color for each displayed point in up to three spatial dimensions. Feature template results consist of the set of confidence images produced by the image processing means.

For a typical display, from the set of feature template results 602, a feature template selection module/interface 604 is used to select a subset of feature template results to display. This selection may be performed manually or automatically. In such an interface, the template results may be determined via a graphical color-mapping interface that allows a user to set a color for each template result to be displayed. The template results correspond to the templates selected for use with the image. Each of the results that has a color specified will be selected for display. A common interface may be used, such as that illustrated in the screen shots of FIGS. 9A and 9B. In that case, constraints may be substantially predetermined after initial inputs (e.g., selection of breast evaluation by phased array coil MRI.) On the other hand, skilled practitioners may also vary the individual constraint settings by button menus, slider bars and the like (e.g., as illustrated, the max, min and error values at each time step can be varied as deemed suitable by the medical service provider.) Next, in display processing 408, feature results may be mapped at a particular point to a color and opacity specified along with other display processing, allowing for enhanced recognition when displayed on-screen to the medical service provider (e.g., in the case of the screen shots of FIGS. 9A-9B, the identified region where the axes intersect may be shown in shades of red or another designated color to indicate varying confidence levels, while regions without sufficient confidence levels would be displayed in gray-scale). Each feature template result may be displayed as a distinct assigned color.

The set of confidence values at a particular point in the images is preferably used to determine a color and opacity for the point. For example, DVR may be used to display the intensities at a particular time point in conjunction with the feature template results for each spatial point, with the feature template results consisting of a confidence image for each feature template. The DVR may be implemented using view-aligned slices, using hardware texturing, shading, and blending capabilities to composite a series of slices through volumetric image data to produce a transparent volume rendering.

Figure 9A:
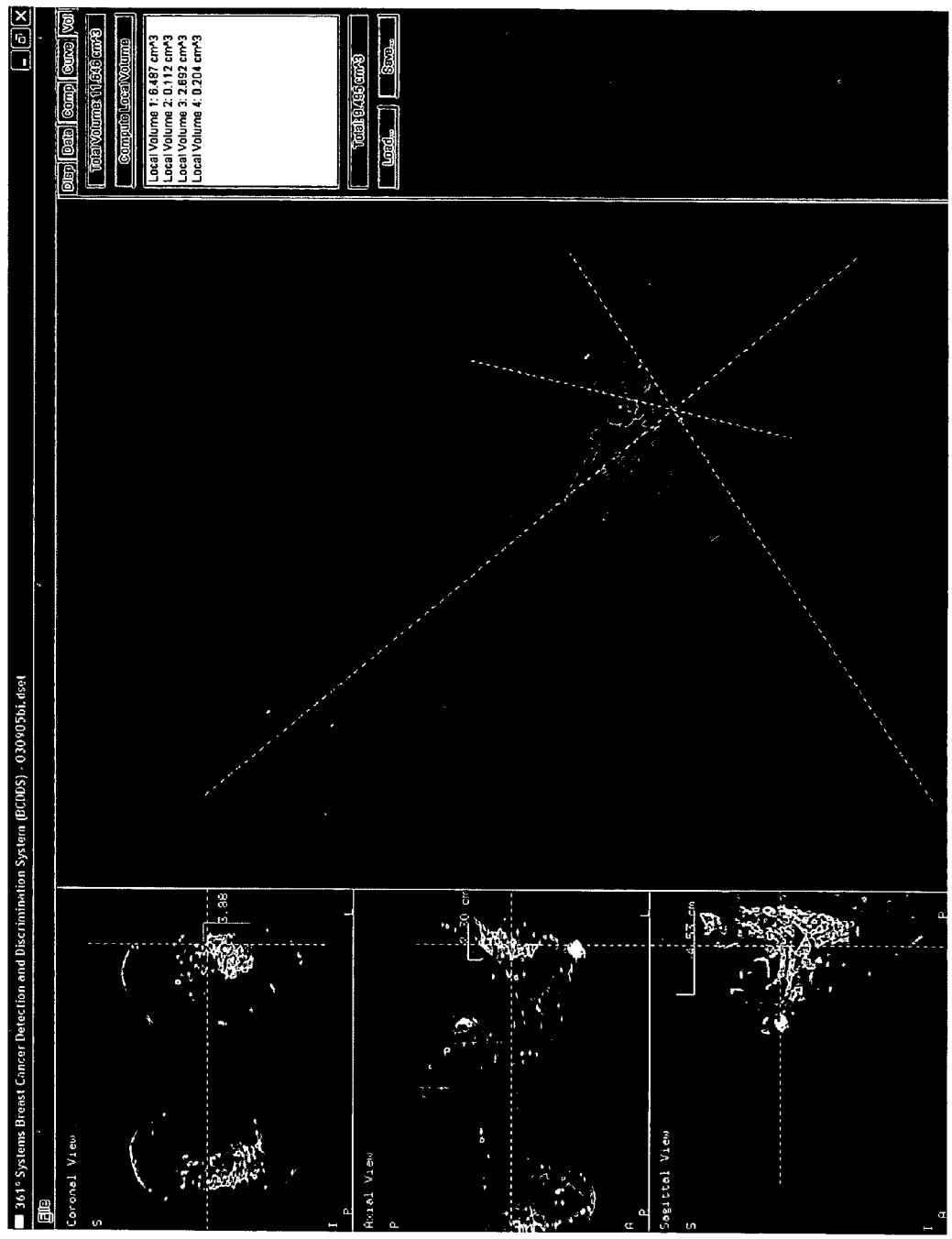
FIGS. 9A-9B are illustrative screen shots of a display resulting from the process according to the embodiment of FIG. 2.
Figure 9B:
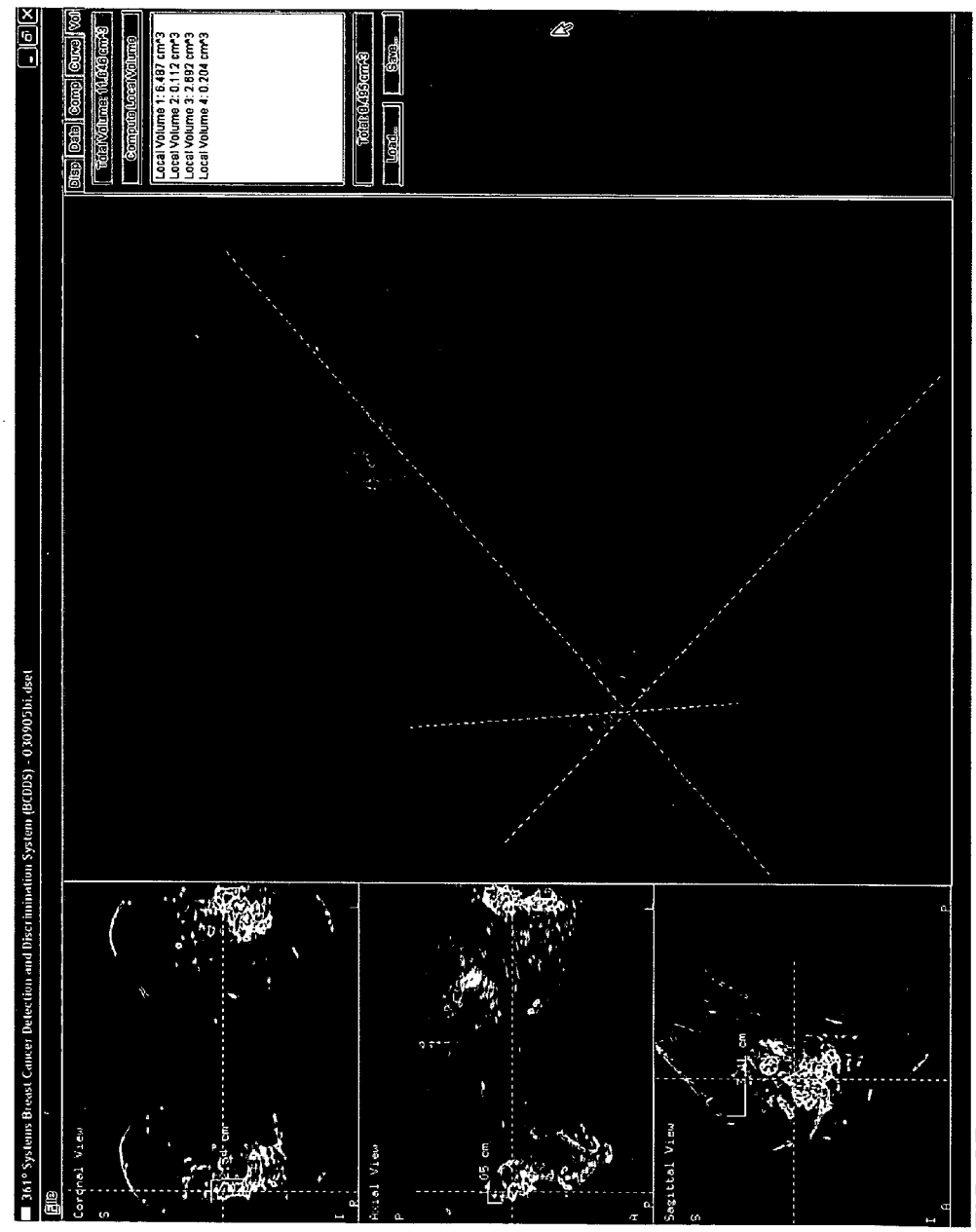

Display processing 608 consists of means to create a graphical representation of the selected set of feature template results from the display parameters. The display parameters may include color parameters that correspond to displayed features and any other desirable parameters related to the display, such as view transformations and a time point for displaying an intensity volume. In the example of FIGS. 9A and 9B, the processing included the creation of geometric primitives for view-aligned DVR slices, texture generation, shader specification, and transformation specification. Other display methods may include features such as ray-tracing, surface rendering, or 2D methods.

The actual mapping of each displayed point and its rendering process is performed by the display device 610. The display device may be any means that can perform rendering for an output device such as a computer monitor. In order to more rapidly render the data and perform what-if analyses, the system used in rendering the screen shots of FIGS. 9A and 9B used a high performance PC video graphics card, with the hardware performing the color mapping for each displayed point in each rendered slice, blending the slices using opacities as weights. But, the implementation is a matter of design choice, and may also be implemented in other approaches like a software renderer.

In the current example, the mapping of confidence values to color and opacity for a particular point may be performed first by computing a weighted average of the color parameters, using the corresponding confidence values as weights. Next, the final color is computed by interpolating between the weighted confidence average and the corresponding intensity value. The opacity is preferably proportional to the maximum of the confidence values. As a result, features are shown blended together and embedded in an intensity volume.

For ease of analysis, the user interface may be designed with a variety of display configurations. For example, in FIG. 9A, a series of buttons are included to allow for rapid shifting between a display based on different constraints and templates for visualization of different tumors or abnormalities (e.g., as shown, five predetermined templates for breast evaluations of DCIS (ductal carcinoma in situ), invasive ductal, lobular, infiltrating lobular, and fibroadnoma). A series of fixed views (e.g., sagittal, coronal, and axial) and a user-manipulatable view (e.g., cursor controlled to zoom and rotate on all three axes) are also advantageously provided. By selecting other buttons, menus for selection of different constraints or templates may be readily presented, which are particularly useful for the researcher or system designer, allowing them rapid visualization of the results of changed constraints. The display system may also include features like predefined regions that have their own color shading (e.g., for procedurally determined tumors mapped onto images), and partially automated what-if or optimization routines (e.g., for a series of images setting known regions to a maximum confidence, and automatically varying the constraints to determine optimal constraints for detection of different tissues).

In addition to use for radiologists, attending physicians and researchers, the system may be advantageously used by other medical service providers such as surgeons. The manipulatable 3D window of FIG. 9A provides a powerful tool for a surgeon to explore the region to be biopsied or resected around the cancer before or during the procedure. For unusual cases, on the fly adjustments of parameters are also possible, to aid in understanding possible regional variations presented.

Figure 10:
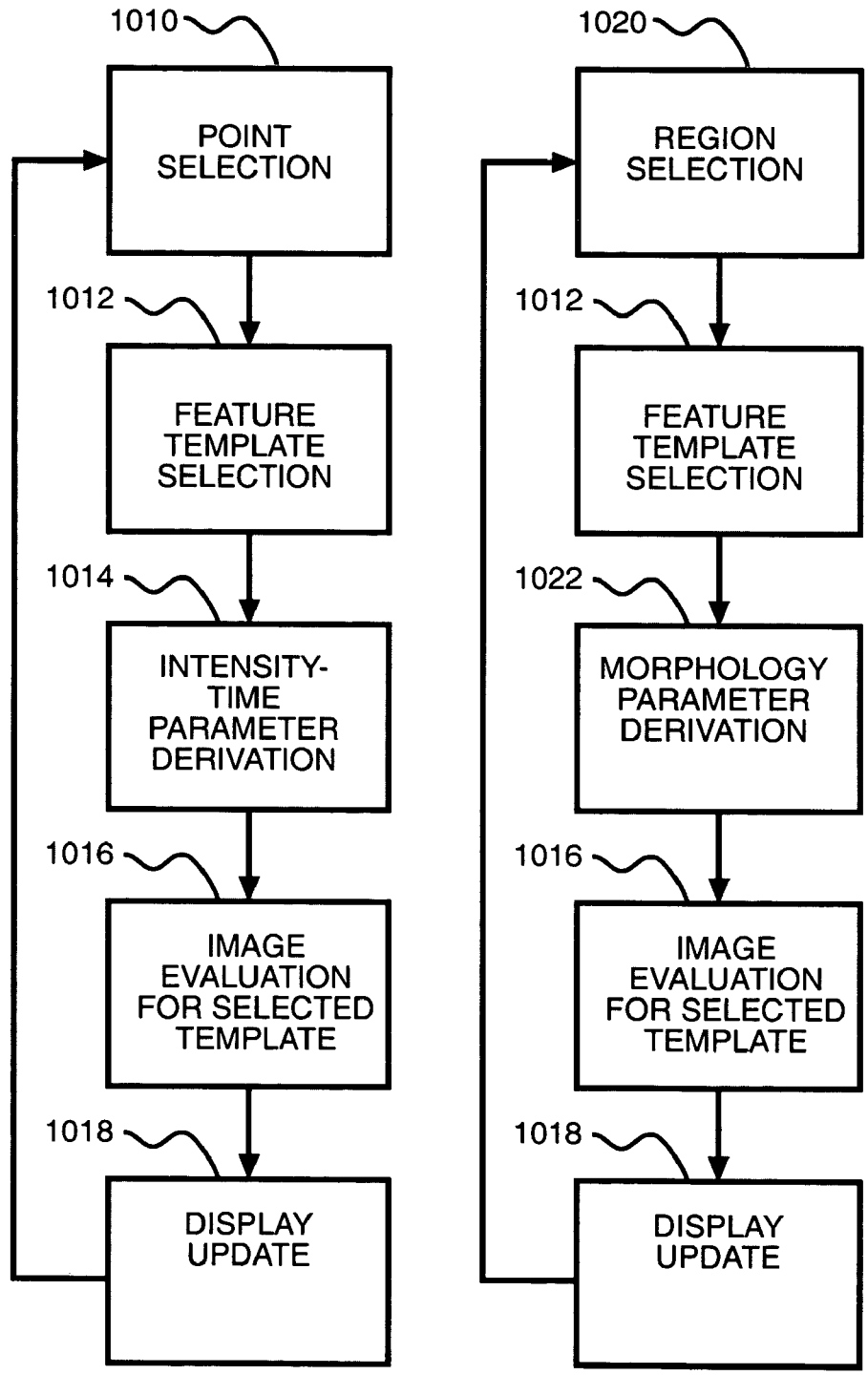
FIG. 10 is a flow chart illustrating an iterative process of defining a feature template according to an embodiment of the invention.

FIG. 10 illustrates a particularly useful way for a medical care provider to make adjustments to the image, allowing for greater user validation and selection of regions of interest. While the automated process described above is a major improvement over earlier methods of identifying abnormalities like cancers, not all regions with abnormalities will be adequately identified by the use of templates or preset parameters. Therefore, in one embodiment the user (e.g., a physician or radiologist) is advantageously provided with an interface for modifying the regions of interest without having to directly adjust the image parameters. This can be performed by any convenient user interface for communicating the determined regions to the user (e.g., by 3-D display, but any other method of boundary description is usable) and inputting a user adjustment (e.g., by optical pen, track ball, keyboard, voice recognition, etc.)

In the current embodiment the user interacts with a manipulatable 3D volume display, or one or more 2-D slice views, using a cursor to select one or more points in the image (step 1010). The points can also be used to define 2-D (e.g., rays between selected points) or 3-D (e.g., spheroids) series of pixels. If these are being selected to derive parameters for a new region, the user is then provided with an option to select a template (e.g., from a menu of all templates, or templates consistent with the characteristics of the points selected), and derive intensity-time parameters (steps 1012-1014). This derivation can be, e.g., by setting, for each time, the minimum constraint parameter to the minimum of the intensities among the curves and the maximum constraint parameter to the maximum of the intensities among the curves at the time. Error allowance can be set to a predetermined value. Alternative methods may also be used, such as averaging each set of time point intensities or using other statistical means to derive representative intensity-time parameters. The intensity image may then be automatically presented to the user for evaluation, such as in the process of FIG. 6 and evaluation steps of FIGS. 4 and 5A (step 1016-18). The parameters may then be further adjusted as described above via the user interface, with a modified image and characteristics shown via an updated display. These processes may be repeated until the user is satisfied with the image and parameters.

Similarly, region selection or modification can proceed via a selection of points or shapes, followed by template selection and derivation of morphology parameters (steps 1020-1024). The set of regions need not be limited to regions for a single feature template result; regions may, e.g., be selected from any of the feature template results. In one embodiment, the user selects regions from a list of identified regions after at least one feature template evaluation is performed on the image. Alternately, regions may be selected from a 3D display of regions. For each morphological characteristic, the minimum and maximum constraint values for the characteristic may then be set to the minimum and maximum characteristic values for that characteristic among the regions. Error allowance may be set to a predetermined value. Alternative methods may also be used, such as averaging each set of characteristic values or using other statistical means to derive representative morphology parameters. The intensity image may then be automatically presented to the user for evaluation, such as in the process of FIG. 6 and evaluation steps of FIGS. 4 and 5A (step 1026-28). The parameters may then be further adjusted as described above via the user interface, with a modified image and characteristics shown via an updated display. These processes may be repeated until the user is satisfied with the image and parameters.

Those skilled in the art will appreciate how this process readily encompasses a variety of ways for the user to interact in the selection or modification of points or regions of interest. Thus, e.g., if a user is satisfied that a region is correctly identified as an abnormality, but is not satisfied with the boundaries of the region, this process can be used in allowing the user to rapidly adjust the boundaries and/or parameters in selecting the region of interest. For example, if the user thinks the region should include additional points, the user can select (e.g., click) on one or more points that s/he thinks should be included in the region of interest. As discussed above, this can result in the automatic adjustment of parameters (e.g., minimum thresholds) based on the time-intensity information of the new region. On the other hand, if the user does not want to adjust the overall regional parameters, these points can then be used to define a new volume for inclusion as part of the region of interest. This region could be added as a one-time adjustment (e.g., by a surgeon right before operation), or added such that it is tracked via its geometric relationship to the region identified before modification.

To facilitate comparison and selection between different outcomes, the user can also select different option sets for visual (e.g., side by side slices, superimposed with different shading, etc.) and data set (e.g., threshold, percent matches, etc.) comparisons in determining which outcome appears to be the optimal one(s) to use by the medical provider. This is straightforward to do with the same image file, since the bulk of the data is constant (i.e., the raw MRI image file), and while the computation of different outcomes does take time, the visual presentation of each outcome can be saved as a reduced data file to be presented according to any convenient manner for visual or data comparison. It is also possible to extend this comparison tool to use in different image files (e.g., images taken several weeks apart), although care would be needed in interpreting any visual comparison since the overall volume and location of regions within a breast can vary by over 50% in the course of a typical females menstrual cycle. It is also possible to improve such a visual comparison between time-displaced images by normalizing the images, e.g., by taking known features in both images and adjusting the relative pixel location of one image to optimally match the location of such features in both images. While no such normalization algorithm has been developed and validated to date, such should be within the skill of a research physician given sufficient time and resources, and once developed would be a matter of design choice, based on different algorithmic parameters, for implementation as part of the comparison routine of this alternative embodiment.

Of course, one skilled in the art will appreciate how a variety of alternatives are possible for the individual elements, and their arrangement, described above, while still falling within the scope of the invention. Thus, while it is important to note that the present invention has been described in the context of an implementation on a personal computer, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions, and the signal bearing media may take the form of coded formats that are decoded for actual use in a particular data processing system.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

We claim:

1. A method for processing an image of a region of interest in a person or other mammal to detect abnormalities, comprising:
   (a) receiving the image having spatial information of the region of interest taken at plural times by capturing the image via a magnetic resonance imaging (MRI) system and processing the image to enhance detectability of the features;
   (b) processing the image using at least one predetermined feature template, morphology parameters, and intensity parameters varying over the plural times, to determine a confidence image, wherein each feature template represents at least one predetermined detectable feature for the region of interest and the confidence image represents a likelihood that the at least one feature is present in the region of interest; and
   (c) outputting the confidence image for further processing and detection of abnormal features.

2. The method of claim 1, wherein step (b) comprises processing the image, at least one template and intensity parameters to determine a composite intensity value for each spatial point in the image.

3. The method of claim 2, comprising processing the composite intensity values to identify plural regions within the region of interest, each region sharing common predetermined characteristics.

4. The method of claim 3, wherein the step of identifying the regions comprises identifying continuous spatial points each having a composite intensity value substantially within predetermined minimum and maximum thresholds.

5. The method of claim 3, further comprising determining a region confidence value for each identified region based on at least one morphology characteristic, using predetermined morphology parameters.

6. The method of claim 5, wherein the region confidence value is determined based on a comparison of characteristics of each identified region to predetermined characteristics of at least one of the group of a measure of the regions curvature, eccentricity, filled volume, and solidity.

7. The method of claim 5, wherein the confidence image includes a value for each spatial point based on the composite intensity value and a region confidence value for each said spatial point.

8. The method of claim 2, further comprising processing the image and at least one intensity range filter to determine an intensity range confidence image, processing the image and at least one relative curve filter to determine a relative curve confidence image, and processing both the relative curve confidence image and the intensity range confidence image to determine the composite intensity values, the composite intensity values together forming the confidence image.

9. The method of claim 2, step (c) further comprising determining, based on the composite intensity values, each identified region having characteristics of a first abnormality.

10. The method of claim 9, further comprising displaying the confidence image as a 3-D manipulatible image with at least one region having characteristics of the first abnormality visually displayed with a similar color to assist with visual identification of at least one region having characteristics of the first abnormality.

11. The method of claim 9, further comprising comparing each identified region having characteristics of said first abnormality with previously determined information about the spatial location of said first abnormality in the region of interest, and iteratively adjusting at least one parameter for at least one of the predetermined feature templates, morphology parameters, and intensity parameters to determine if said adjusted parameter results in confidence image better identifying the spatial location of said first abnormality.

12. The method of claim 9, step (c) further comprising inputting a user selection of spatial locations within the image and in response to the user selection, and automatically determining at least one of a region or a parameter based on one or more parameters of the selected spatial locations.

13. The method of claim 12, wherein the step of automatically determining comprises at least one of:
(c1) automatically determining at least one new region of interest differing from each identified region, based on the user selection of spatial locations and further user selection of a feature template and confirmation of derived time-intensity parameters; and
(c2) automatically determining at least one of a modified boundary and dimension for an identified region, based on the user selection of spatial locations and further user selection of a feature template and confirmation of derived morphology parameters.

14. The method of claim 1, wherein the preprocessing comprises normalizing the image, and the composite intensity value for each spatial point in the image is one of the group of an average or a product of all normalized intensity values for each said spatial point at the plural times.

15. The method of claim 1, wherein the image comprises spatial information taken at least three predetermined times after administration of a chemical substance having detectible wash-in and wash-out intensity characteristics in abnormalities within the period of the predetermined times.

16. The method of claim 15, wherein the chemical substance comprises gadolinium.

17. An information processing system for detecting abnormalities in a region of interest in a person or other mammal, the system comprising an input capable of receiving an image file comprising spatial information of the region of interest taken at plural times, a processor, and an image processing application, the image processing application comprising plural instructions and the processor is operably configured to execute said plural instructions, the plural instructions comprising:
(a) confidence image determination instructions, for processing the image file using at least one predetermined feature template, morphology parameters, and intensity parameters varying over the plural times, to determine a confidence image, wherein each feature template represents at least one predetermined detectable feature for the region of interest and the confidence image represents a likelihood that the at least one feature is present in the region of interest; and
(b) detection instructions, for outputting the confidence image for further processing and detection of abnormal features.

18. The system of claim 17, wherein the confidence image determination instructions further comprise instructions operable for processing the image, at least one template and intensity parameters to determine a composite intensity value for each spatial point in the image.

19. The system of claim 18, wherein the confidence image determination instructions further comprise instructions operable for (a) processing the composite intensity values to identify plural regions within the region of interest, each region sharing common predetermined characteristics, and substantially continuous spatial points each having a composite intensity value substantially within predetermined minimum and maximum thresholds.

20. The system of claim 19, the confidence image determination instructions further comprise instructions operable for determining a region confidence value for each identified region based on at least one morphology characteristic, using predetermined morphology parameters, wherein the region confidence value is determined based on a comparison of characteristics of each identified region to predetermined characteristics of at least one of the group of a measure of the regions curvature, eccentricity, filled volume, and solidity, and wherein the confidence image includes a value for each spatial point determined based on the composite intensity value and a region confidence value for each said spatial point.

21. The system of claim 18, wherein the confidence image determination instructions further comprise instructions operable for processing the image and at least one intensity range filter to determine a intensity range confidence image, processing the image and at least one relative curve filter to determine a relative curve confidence image, and processing both the relative curve confidence image and the intensity range confidence image to determine the composite intensity values, the composite intensity values together forming the confidence image.

22. The system of claim 18, wherein the detection instructions further comprise instructions operable for determining, based on the composite confidence values, each identified region having characteristics of a first abnormality, and for displaying the confidence image as a 3-D manipulatible image with all regions having characteristics of the first abnormality visually displayed with a similar color to assist with visual identification of each said region.

23. The system of claim 22, wherein the detection instructions further comprise instructions operable for comparing each identified region having characteristics of said first abnormality with previously determined information about the spatial location of said first abnormality in the region of interest, and iteratively adjusting at least one parameter for at least one of the predetermined feature template, morphology parameters, and intensity parameters to determine if said adjusted parameter results in confidence image better identifying the spatial location of said first abnormality.

24. The system of claim 22, wherein the detection instructions further comprise instructions operable for inputting a user selection of spatial locations within the image and in response to the user selection, and automatically determining at least one of a region or a parameter based on one or more parameters of the selected spatial locations by:
(b1) automatically determining at least one new region of interest differing from said regions, based on the user selection of spatial locations and further user selection of a feature template and confirmation of derived time-intensity parameters; and
(b2) automatically determining at least one of a modified boundary and dimension for at least one of said regions, based on the user selection of spatial locations and further user selection of a feature template and confirmation of derived morphology parameters.

25. The system of claim 17, wherein the confidence image determination instructions further comprise instructions operable for capturing the image file via a magnetic resonance imaging (MRI) system and preprocessing the captured image to enhance detectability of the features, the image file comprising spatial information taken at least three predetermined times after the administration of a chemical having detectible wash-in and wash-out intensity characteristics in abnormalities within the period of the predetermined times, and the substance comprising gadolinium.

26. A method for determining regions of interest in a person or other mammal representing abnormalities from an MRI image comprising plural images taken at proximate times, the method comprising:

(a) processing the image using at least one predetermined feature template, morphology parameters, and intensity parameters varying over the plural times, to determine a confidence image comprising a composite intensity value for each spatial point in the image, and further processing the composite intensity values to identify one or more regions of interest within the image sharing common predetermined characteristics, wherein the confidence image represents a likelihood that the region of interest includes an abnormality;

(b) displaying at least one of a 2-D or 3-D display representation of the confidence image for a medical service provider, and in response to input from the provider based on the display, redetermining the region of interest, wherein the input includes selection via a user interface of at least one of (a) locations within the image but outside of a region of interest, and (b) at least one new parameter used in determining the location and volume of the region of interest.

(c) displaying a further display representation of the confidence image with a modified region of interest based on the user input; and (d) repeating steps (c) and (d) as desired by the provider.

27. The method of claim 25, further comprising comparing each identified region having characteristics of said first abnormality with previously determined information about the spatial location of said first abnormality in the region of interest, and iteratively adjusting at least one parameter for at least one of the predetermined feature templates, morphology parameters, and intensity parameters to determine if said adjusted parameter results in confidence image better identifying the spatial location of said first abnormality.

28. The method of claim 25, further comprising, in response to the provider selection, automatically determining at least one of a region or a parameter based on one or more parameters of the selected spatial locations, wherein the step of automatically determining comprises at least one of:

(b1) automatically determining at least one new region of interest differing from each identified region, based on the user selection of spatial locations and further user selection of a feature template and confirmation of derived time-intensity parameters; and (b2) automatically determining at least one of a modified boundary and dimension for an identified region, based on the user selection of spatial locations and further user selection of a feature template and confirmation of derived morphology parameters.

* * * * *